United States Patent
Lee et al.

(10) Patent No.: US 10,116,786 B2
(45) Date of Patent: *Oct. 30, 2018

(54) APPARATUS FOR CONTROLLING A MULTIMEDIA MESSAGE IN A USER EQUIPMENT OF A WIRELESS COMMUNICATION SYSTEM AND METHOD THEREOF

(71) Applicant: LG ELECTRONICS INC., Seoul (KR)

(72) Inventors: Joowoo Lee, Seoul (KR); Kyunghye Seo, Seoul (KR); Minkyoung Chang, Seoul (KR); Songyi Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

This patent is subject to a terminal disclaimer.

(21) Appl. No.: 15/082,712

(22) Filed: Mar. 28, 2016

(65) Prior Publication Data
US 2016/0212255 A1    Jul. 21, 2016

Related U.S. Application Data

(63) Continuation of application No. 13/205,509, filed on Aug. 8, 2011, now Pat. No. 9,300,785.

(30) Foreign Application Priority Data

Jun. 1, 2011    (KR) .................. 10-2011-0052776

(51) Int. Cl.
*G06F 3/041*    (2006.01)
*H04M 1/725*    (2006.01)
(Continued)

(52) U.S. Cl.
CPC ...... *H04M 1/72547* (2013.01); *G06F 3/0486* (2013.01); *G06F 3/04886* (2013.01); *H04W 4/12* (2013.01); *G06F 2203/04803* (2013.01)

(58) Field of Classification Search
CPC ............... G06F 3/0486; G06F 3/04886; G06F 2203/04803
(Continued)

(56) References Cited

U.S. PATENT DOCUMENTS 5,894,305 A * 4/1999 Needham ............ H04L 12/1822
                                                              709/220
6,529,500 B1    3/2003 Pandharipande
(Continued)

FOREIGN PATENT DOCUMENTS

CN         1885985      12/2006
CN       101645960       2/2010
(Continued)

OTHER PUBLICATIONS

State Intellectual Property Office of the People's Republic of China Application Serial No. 201510259627.3, Office Action dated Jul. 14, 2017, 23 pages.

*Primary Examiner* — Towfiq Elahi
(74) *Attorney, Agent, or Firm* — Lee Hong Degerman Kang & Waimey

(57) ABSTRACT

An apparatus for controlling a multimedia message in a user equipment of a wireless communication system and method thereof are disclosed. The present invention includes a touchscreen configured to display at least one first region corresponding to each message exchange unit and a second region for displaying an information of a content exchanged via the first region and a controller, if the information of the content displayed on the second region is selected, controlling the selected content information to be displayed on the at least one first region. In this case, the message exchange (Continued)

unit includes a group comprising at least two message exchange targets which are identified by at least one identification information.

31 Claims, 18 Drawing Sheets

(51) Int. Cl.
  *G06F 3/0486* (2013.01)
  *G06F 3/0488* (2013.01)
  *H04W 4/12* (2009.01)

(58) Field of Classification Search
  USPC .......................................................... 345/173
  See application file for complete search history.

(56) References Cited

U.S. PATENT DOCUMENTS

| | | | |
|---|---|---|---|
| 6,941,354 B2 | 9/2005 | Odamura | |
| 8,294,680 B2* | 10/2012 | Karlsson | G06F 3/0233 345/173 |
| 8,621,366 B1 | 12/2013 | Sampath | |
| 9,300,785 B2 | 3/2016 | Lee et al. | |
| 2001/0039194 A1 | 11/2001 | Odamura | |
| 2004/0203772 A1 | 10/2004 | Galetti | |
| 2008/0057926 A1 | 3/2008 | Forstall et al. | |
| 2009/0187842 A1* | 7/2009 | Collins | G06F 3/0482 715/769 |
| 2009/0247112 A1* | 10/2009 | Lundy | G06F 3/0237 455/404.1 |
| 2009/0254616 A1 | 10/2009 | Cheung et al. | |
| 2010/0240402 A1 | 9/2010 | Wickman et al. | |
| 2011/0257958 A1 | 10/2011 | Kildevaeld | |
| 2012/0021782 A1 | 1/2012 | Jung et al. | |
| 2012/0151382 A1* | 6/2012 | Zhang | G06F 8/73 715/752 |
| 2012/0144286 A1 | 7/2012 | Bank et al. | |

FOREIGN PATENT DOCUMENTS

| | | |
|---|---|---|
| EP | 1739533 | 1/2007 |
| WO | 2010110613 | 9/2010 |

* cited by examiner (a) Control-plane protocol stack (b) User-plane protocol stack, SAE gateway

APPARATUS FOR CONTROLLING A MULTIMEDIA MESSAGE IN A USER EQUIPMENT OF A WIRELESS COMMUNICATION SYSTEM AND METHOD THEREOF

CROSS-REFERENCE TO RELATED APPLICATIONS

This application is a continuation of U.S. application Ser. No. 13/205,509, filed on Aug. 8, 2011, now U.S. Pat. No. 9,300,785, which claims the benefit of earlier filing date and right of priority to Korean Application No. 10-2011-0052776, filed on Jun. 1, 2011, the contents of which are hereby incorporated by reference herein in their entirety.

BACKGROUND OF THE INVENTION

Field of the Invention

The present invention relates to a wireless communication system, and more particularly, to an apparatus for controlling a multimedia message in a user equipment of a wireless communication system and method thereof.

Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or video files, game play, broadcast reception and the like for example.

To support and increase the terminal functions, it may be able to consider the improvement of structural parts and/or software parts of the terminal.

Recently, as short text/multimedia messages tend to be exchanged between mobile terminals more frequently, the demand for a graphic user interface (hereinafter abbreviated GUI) capable of sending and managing messages more conveniently and efficiently is rising.

SUMMARY OF THE INVENTION

Accordingly, the present invention is directed to an apparatus for controlling a multimedia message in a user equipment of a wireless communication system and method thereof that substantially obviate one or more problems due to limitations and disadvantages of the related art.

An object of the present invention is to provide an apparatus for controlling a multimedia message in a user equipment of a wireless communication system and method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal in a wireless communication system according to the present invention includes a touchscreen configured to display at least one first region corresponding to each message exchange unit and a second region for displaying an information of a content exchanged via the first region and a controller, if the information of the content displayed on the second region is selected, controlling the selected content information to be displayed on the at least one first region. Moreover, the message exchange unit includes a group comprising at least two message exchange targets which are identified by at least one identification information.

Preferably, the identification information includes a phone number, an email address, a social network service ID, and a name and photo, which are saved in a phonebook, of each of the message exchange targets and the controller controls at least one of the identification informations to be displayed in a prescribed form on each of the at least one first region. And, the message includes a short text message (SMS), a multimedia message (MMS), a social network service (SNS) message and an email. Moreover, messages displayed on each of the at least one first region are enumerated to form a message thread in order of time.

Preferably, if a drag input, which starts at an information of a specific content in the second region and is canceled at the first region, is inputted, the controller controls the specific content to be formed as a message in the first region.

More preferably, if the specific content formed as the message is not transmitted via the at least one first region, the controller controls an identifier for a retransmission of the specific content to be displayed on a foregoing part of the second region.

And, if a preset condition is met, the controller controls a popup message for the retransmission of the content to be displayed on the touchscreen. In this case, the preset condition comprises a handover into an LTE (long term evolution) network of the mobile terminal More preferably, if the mobile terminal is located in an overlapping area between the LTE (long term evolution) network and a 3G network and is connected to the 3G network, the controller controls a popup message for selecting whether to make a handover into the LTE network to be displayed on the touchscreen.

Preferably, while a specific first region is selected, if a drag input, which starts at a different first region except the specific first region and is cancelled at the specific first region, is inputted via the touchscreen, the controller controls a first region to be generated to correspond to a group including a message exchange unit corresponding to the specific first region and a message exchange unit corresponding to the different first region.

In another aspect of the present invention, a method of controlling a mobile terminal includes the steps of entering a message menu, displaying at least one first region corresponding to each message exchange unit and a second region for displaying an information of a content exchanged via the first region, selecting the information of the content displayed on the second region in a prescribed form, and displaying the selected content information on the at least one first region. Moreover, the message exchange unit includes a group comprising at least two message exchange targets which are identified by at least one identification information.

Preferably, the method further includes the steps of detecting a drag input, which starts at an information of a specific content in the second region and is canceled at the first region and forming the specific content as a message in the first region.

More preferably, the method further includes the step of if the specific content formed as the message is not transmitted via the at least one first region, displaying an identifier for a retransmission of the specific content on a foregoing part of the second region.

Accordingly, the present invention provides the following effects and/or advantages.

First of all, a user equipment in a wireless communication system is able to effectively control a multimedia message and is also able to be stably provided with a service based on the effective multimedia message control. In particular, in case of attempting to transmit a file of a large capacity, the present invention leads the corresponding transmission to be performed via 4G network, thereby enabling a more stable file transmission.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
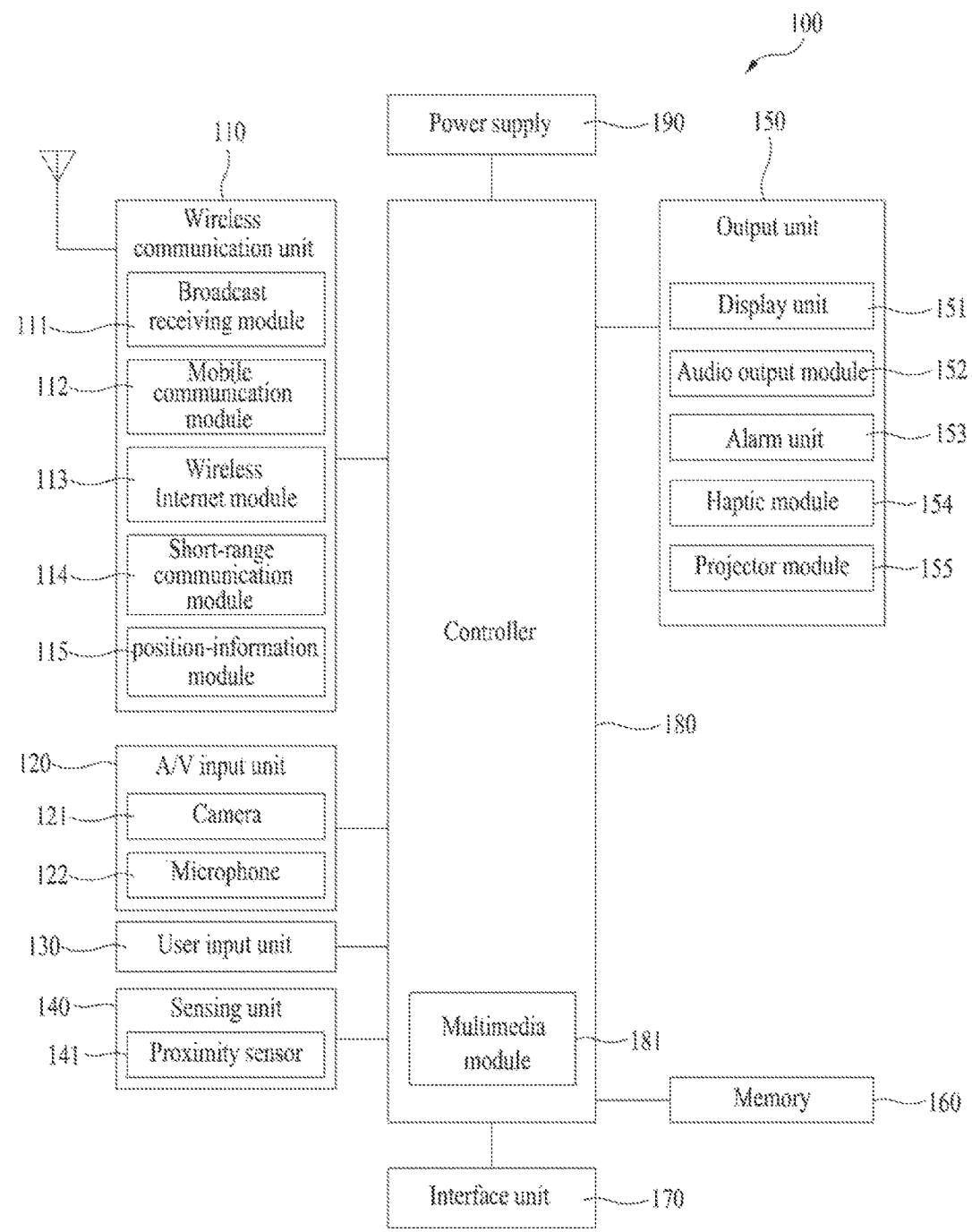
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
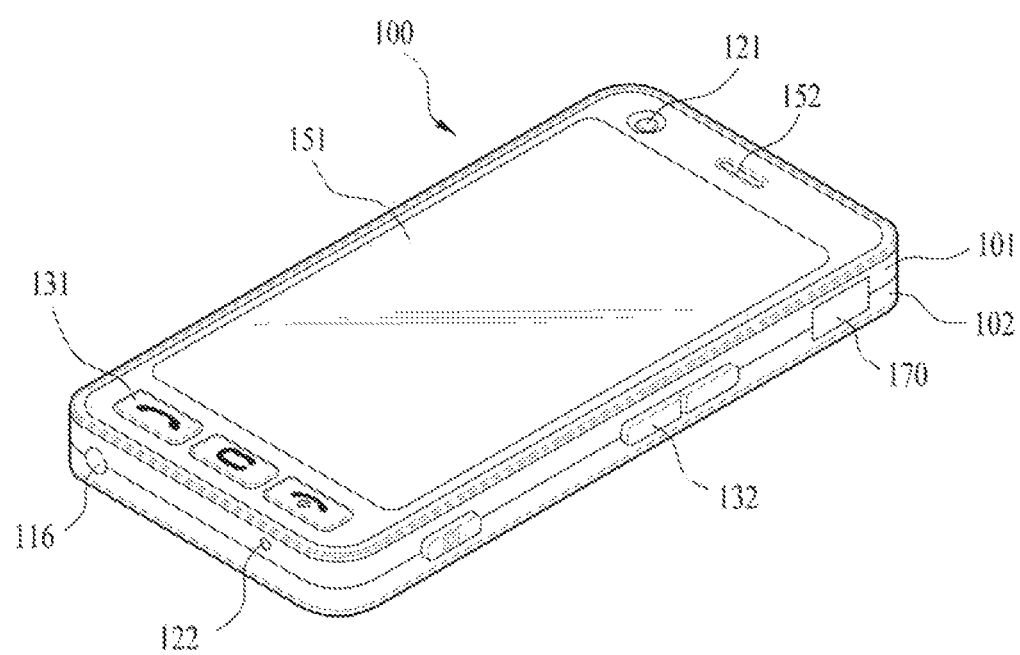
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
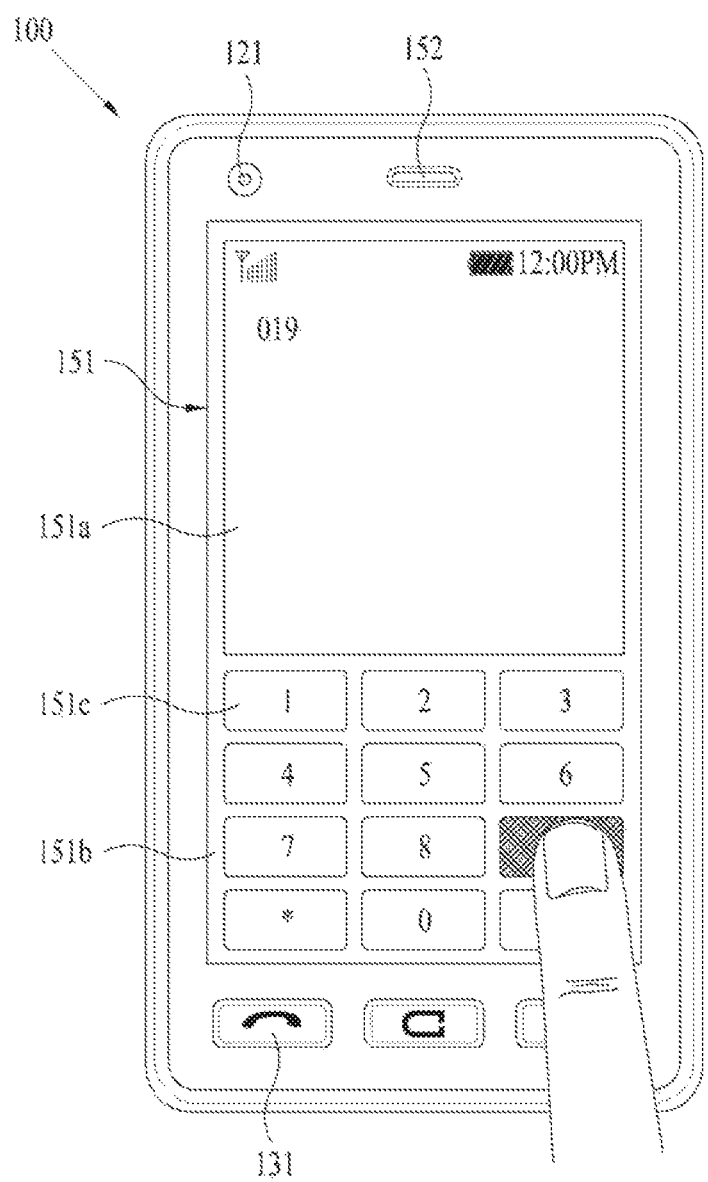
FIG. 3 is a front diagram of a mobile terminal according to one embodiment of the present invention to describe one operating status thereof.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

As an example of a wireless communication system to which the present invention may be applied, a 3GPP LTE ($3^{rd}$ Generation Partnership Project Long Term Evolution; hereinafter referred to as "LTE") communication system will now be broadly described.

As an example of a wireless communication system to which the present invention may be applied, a 3GPP LTE ($3^{rd}$ Generation Partnership Project Long Term Evolution; hereinafter referred to as "LTE") communication system will now be broadly described.

Figure 4:
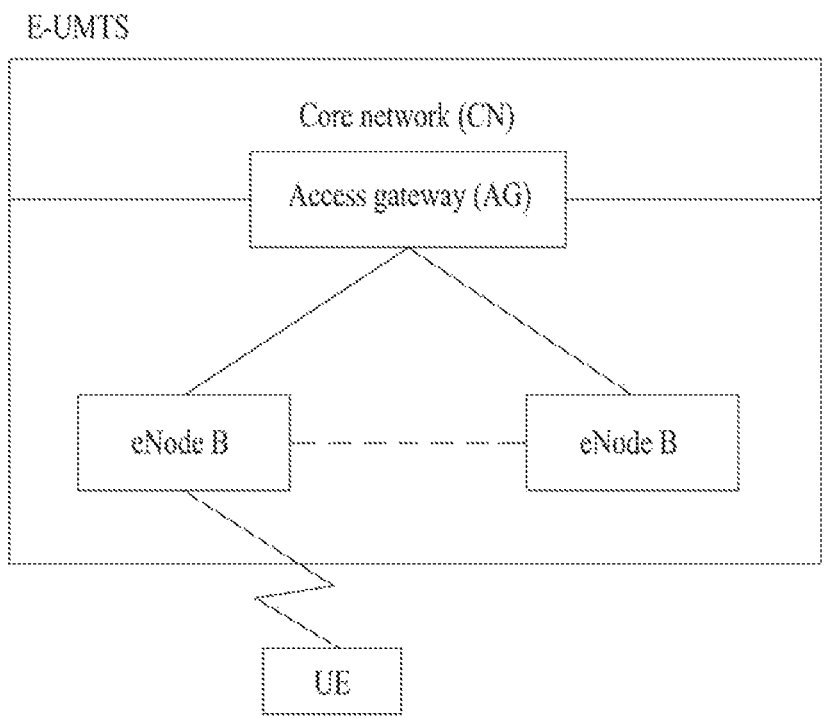
FIG. 4 is a schematic diagram of E-UMTS network structure for example of a mobile communication system.

FIG. 4 illustrates a general view of an E-UMTS network structure as an example of a wireless communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 4, the E-UMTS includes a User Equipment (UE), base stations (eNode B; eNB), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competitiveness in the future. Accordingly, characteristics, such as reduced cost for each bit, extended service availability, usage of a flexible frequency band, simple structure and open interface, and adequate power consumption of the user equipment are being requested.

Figure 5:
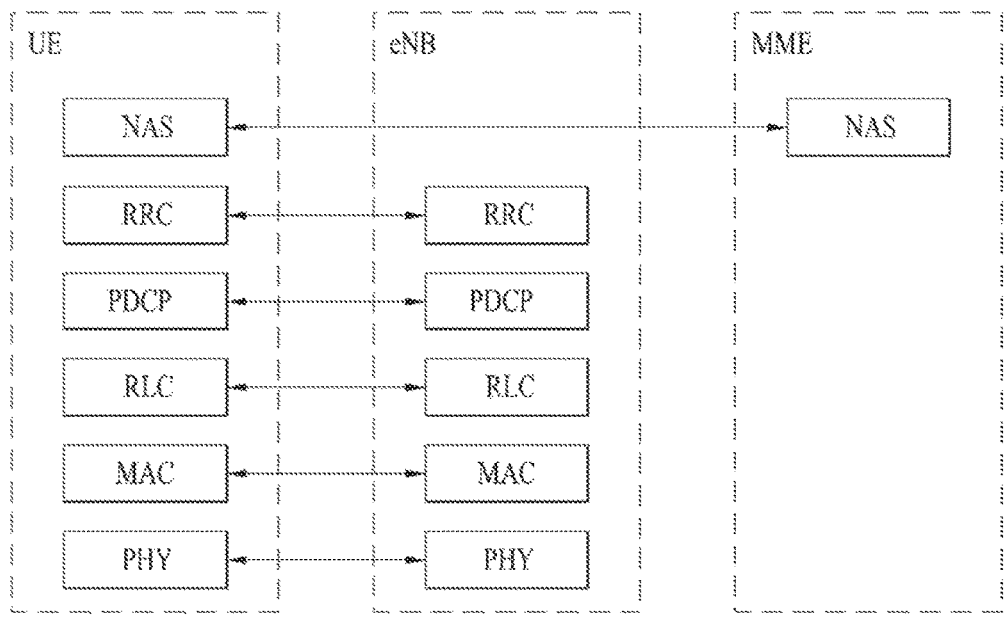
FIG. 5 is a diagram of control and user plane structures of a radio interface protocol between a user equipment and E-UTRAN based on 3GPP radio access network specifications.
Figure 5:
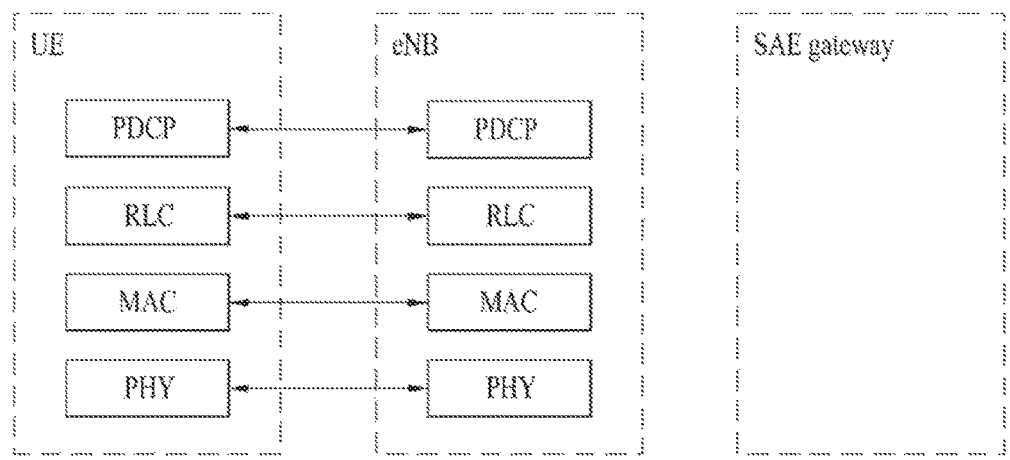

FIG. 5 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel. In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The RB refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.25, 2.5, 5, 10, and 20 MHz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

In the following detailed description, a basic configuration of a message menu user interface according to an embodiment of the present invention is explained with reference to FIG. 6.

Figure 6:
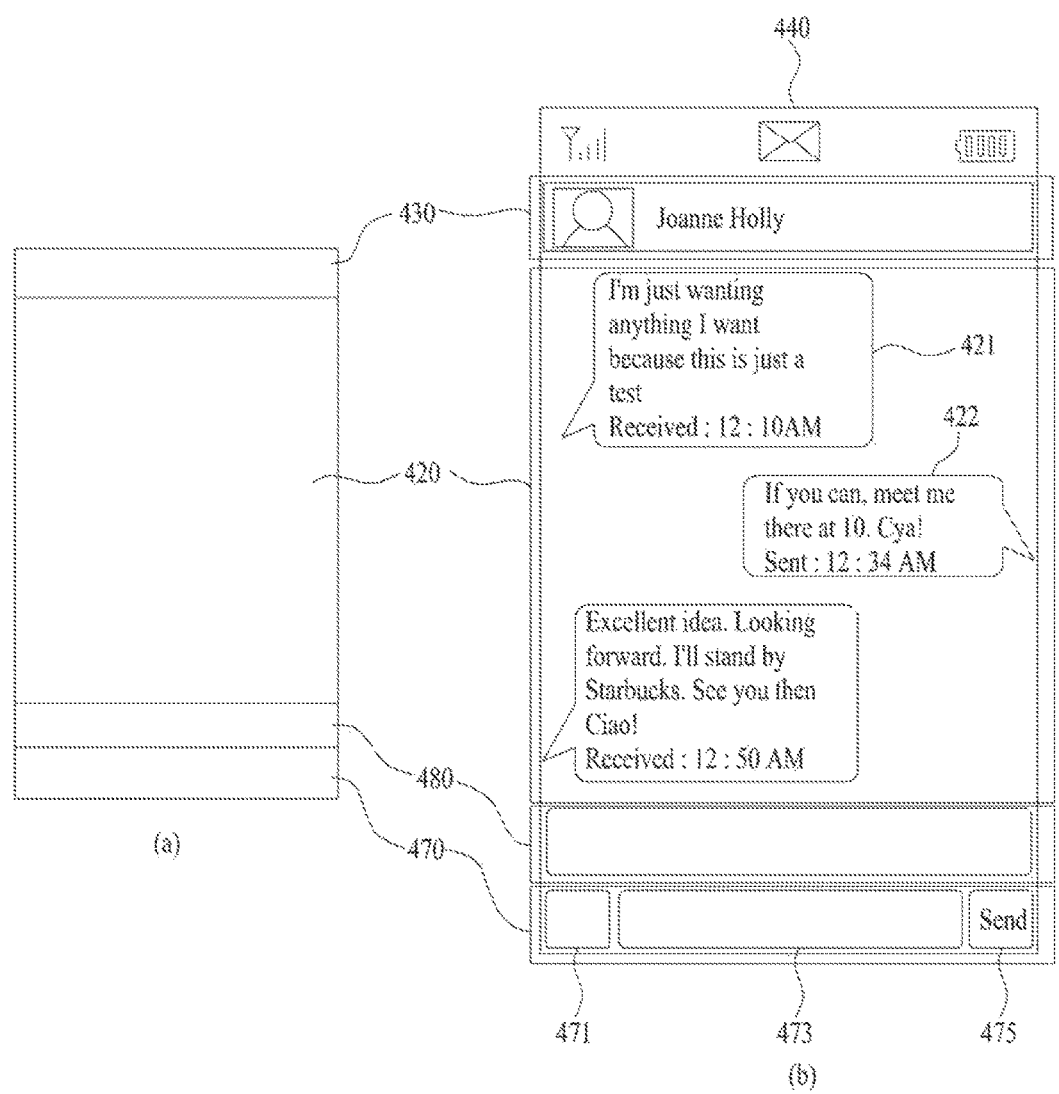
FIG. 6 is a diagram of a basic configuration of a message menu user interface according to an embodiment of the present invention.

FIG. 6 is a diagram of a basic configuration of a message menu user interface according to an embodiment of the present invention.

First of al, FIG. 6 (a) shows a schematic structure of a menu configuration of a message menu user interface.

Referring to FIG. 6 (a), a message region 420 for displaying message contents in a prescribed form is arranged in a message menu. On the message region 420, contents of a message transceived for a single target or a single group are displayed. And, the displayed message contents can include a message text, a transmitted/received hour, an attached file list, an attached file preview (e.g., thumbnail, etc.) and the like. If messages for a single target or a single group are enumerated in a chat format in accordance with a prescribed sort reference (e.g., a time sequence) [i.e., a message thread is formed], a message region shall be named 'thread region' for clarity and convenience of the following description.

A side information region 430 can be optionally provided to a top side of the message menu. On the side information region 430, information displayed on the message region 420 is displayed in further detail or information failing to be displayed on each region can be displayed.

Meanwhile, a queue region 480 can be arranged in the message menu of the present invention. In the queue region 480, messages delivered/received to/from a counterpart, attached files, thumbnails and the like can be accumulated.

Each of the above-mentioned regions 420, 430 and 480 is independently scrolled up & down and/or right and left to display another information that is not currently displayed on a screen.

The above menu configuration described with reference to FIG. 6 (a) is exemplary. The menu configuration is able to contain regions of which types are smaller or greater than those shown in FIG. 6 (a). And, the arranged forms of the above-described menu configuration can be changed in various ways. Yet, it is preferable that both of the target information region and the message region should be included in the above-described menu configuration. The above-described menu configuration is displayable as a whole screen or a preset partial region of the display unit of the mobile terminal 100. If a new message is received or a prescribed command for paging a message menu is inputted, the corresponding menu configuration can be paged.

FIG. 6 (b) exemplarily shows that the menu configuration described with reference to FIG. 6 (a) is displayed on the mobile terminal.

Referring to FIG. 6 (b), an indicator region 440 is displayed on a opt side of the display unit. And, a message menu is displayed as a whole screen on the rest region except the indicator region 440. In this case, the indicator region means a region in which various operating statuses of the mobile terminal (e.g., a radio signal reception strength, a presence or non-presence of a new message reception, a remaining battery level, etc.).

On sub-regions below a new message write menu 415, targets are displayed in accordance with a prescribed sort reference. If an information on a corresponding target exists in a phonebook, a name/photo saved in the phonebook is displayed. And, a phone number is displayed as an identification information on a corresponding target on a sub-region if the target of which name/photo is not saved in the phonebook. Moreover, a visual effect for indicating a new message or an unchecked message can be displayed on each of the sub-regions. For instance, a reference number '451' indicates that there is one new message.

A thread region 420 is arranged in the message menu. On the thread region 420, a message thread of a selected target/group is displayed. Referring to FIG. 6 (*b*), as 'Joanne Holly' is selected, a message thread for the corresponding target is displayed.

Regarding the format of displaying a message on the thread region 420, a message 421 received from a corresponding target and a message 422 sent to the corresponding target are sorted in time order. And, each message content and each message sent/received hour are displayed within a corresponding word balloon. In particular, such a prescribed visual effect as a shape change, a color change and the like is given to the corresponding word balloon to indicate that whether a corresponding message is a sent message or a received message.

A write region 470 for a message writing is provided to a bottom side of the message menu. In the write region 470, a menu 471 for selecting an attached file to be attached to a message in the course of being written, an input window for writing a text, a send menu 475 and the like can be arranged. In particular, a message written via the present region 470 can be selected to a target 411 currently selected from the target information region 410.

As the side information region 430 is arranged at the top side of the message menu, a full name saved in a phonebook of the target 411 selected from the target information region 410 can be displayed on the side information region 430.

In the following description, assume that a user interface of a message menu has such a menu configuration as shown in FIG. 6 (*b*).

First Embodiment

Figure 7:
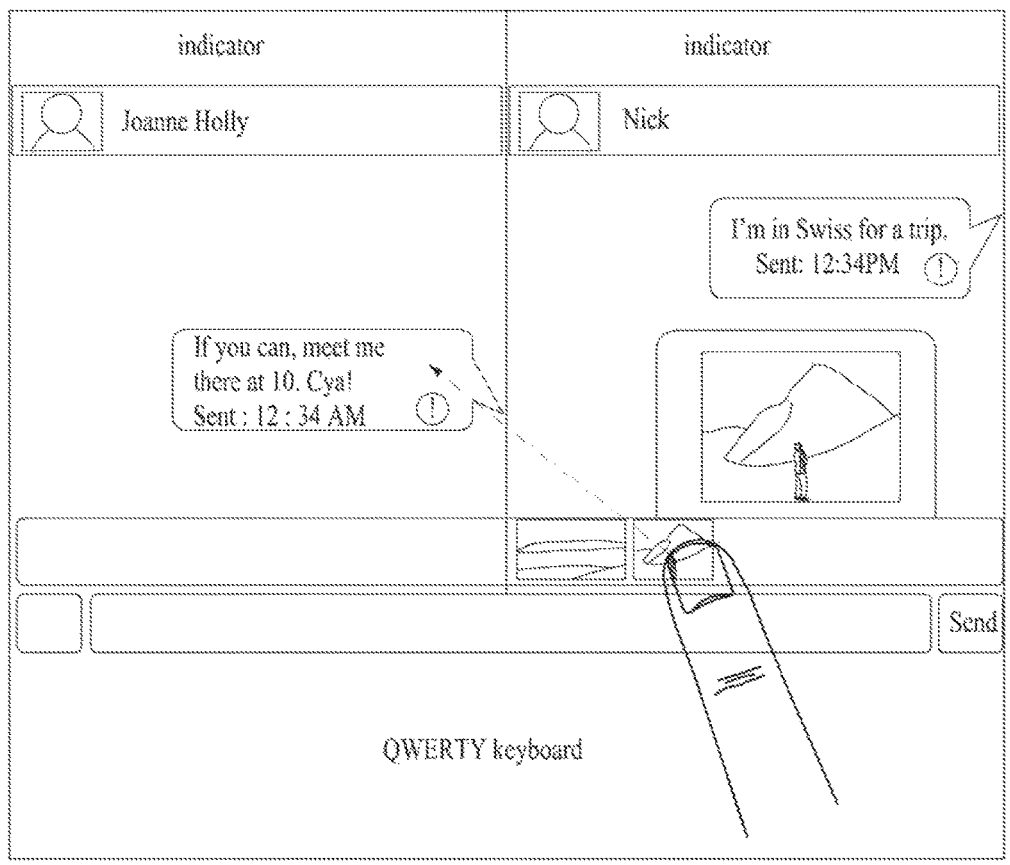
FIG. 7 is a diagram for example of a message sending method according to a first embodiment of the present invention.

FIG. 7 is a diagram for example of a message sending method according to a first embodiment of the present invention.

Referring to FIG. 7, two message windows can be displayed on the display unit of the mobile terminal 100. In particular, a user is able to individually exchange messages with 'Joanne Holly' and 'Nick'. And, the individual message window can be displayed on the display unit.

The user is able to save an image file contained in a message received from 'Nick' in the memory unit of the mobile terminal 100. And, a thumbnail of the image file is preferably displayed on a queue region. In this case, the user performs a touch input in a manner of touching and dragging the thumbnail and then dropping the thumbnail to the message window for 'Joanne Holly', as shown in FIG. 7, thereby delivering the contents received from one user to another user.

In case of a content previously saved in the memory unit of the mobile terminal 100 instead of the image file contained in the message received from 'Nick', the user is able to deliver the content to multiple users simultaneously in a manner of touching and dragging the corresponding content to each of message window for 'Joanne Holly' and the message window for 'Nick' individually.

Meanwhile, such a content saved in the queue region as an image and the like enables a cancel box to pop up though a long touch action. If the cancel box is selected, the user can delete the saved content.

Second Embodiment

Figure 8A:
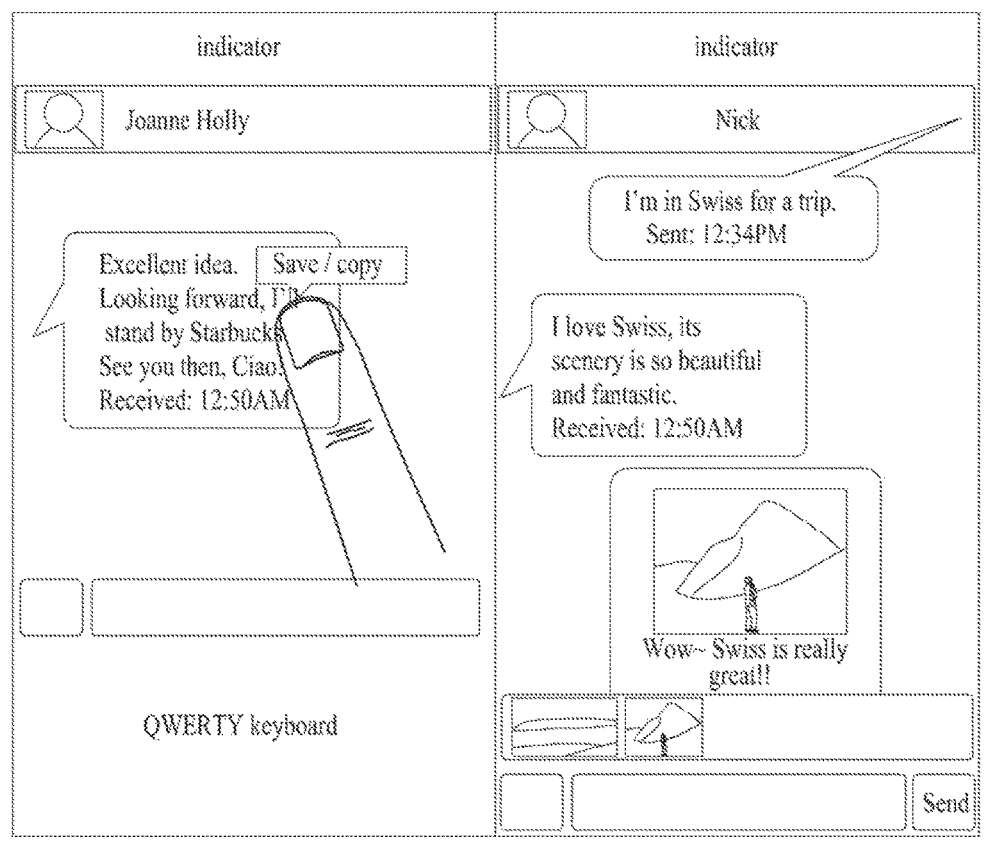
FIG. 8A and FIG. 8B are diagrams for an example of saving and displaying a text information in a queue region according to a second embodiment of the present invention.
Figure 8B:
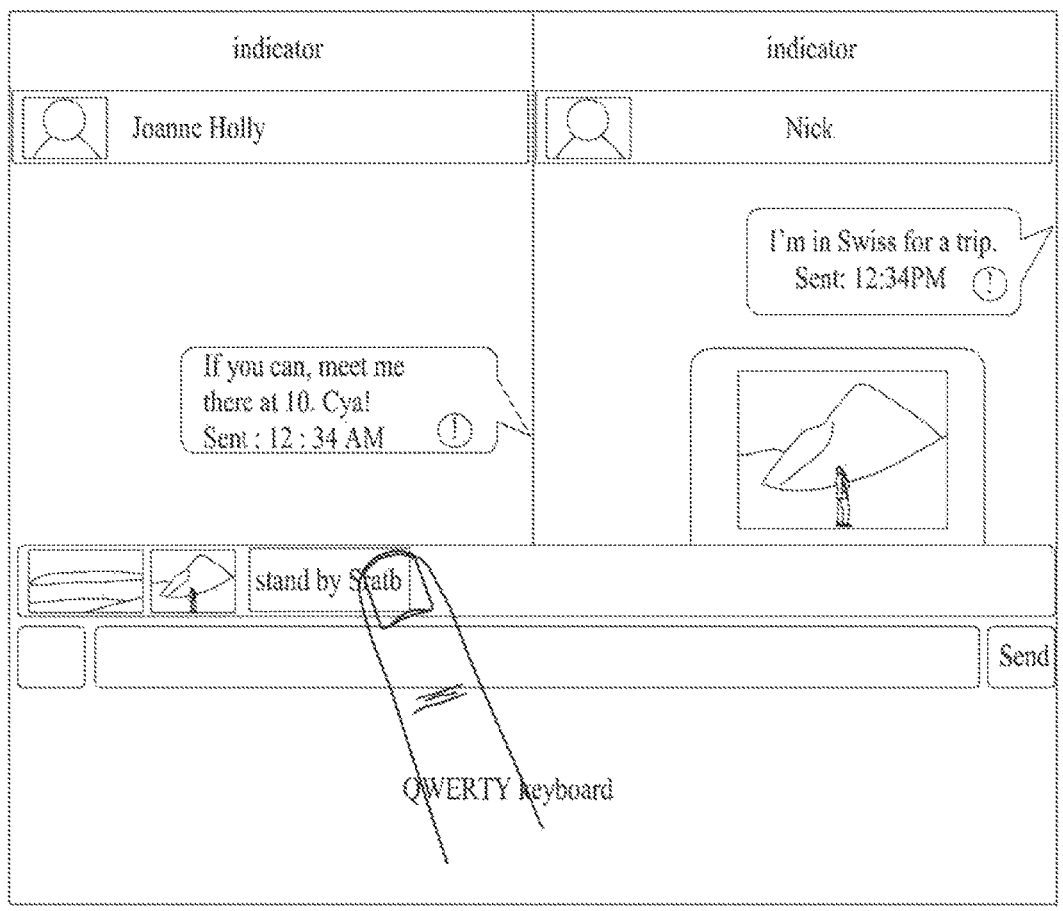

FIG. 8A and FIG. 8B are diagrams for an example of saving and displaying a text information in a queue region according to a second embodiment of the present invention. Likewise, assume that an individual message window for 'Joanne Holly' and an individual message window for 'Nick' are displayed on the display unit.

Referring to FIG. 8A, if a user selects a specific text from a message window for 'Joanne Holly' using a drag action or the like, a save or copy menu for the selected text can pop up. In this case, in case of saving the selected text, the text can be saved as a memo format in the queue region. Preferably, the text saved in the queue region is slidably displayed to enable a user to intuitively recognize a corresponding content.

Meanwhile, the text saved in the queue region enables a cancel box to pop up through a long touch action. If the cancel box is selected, it is able to delete the saved content.

Third Embodiment

Figure 9:
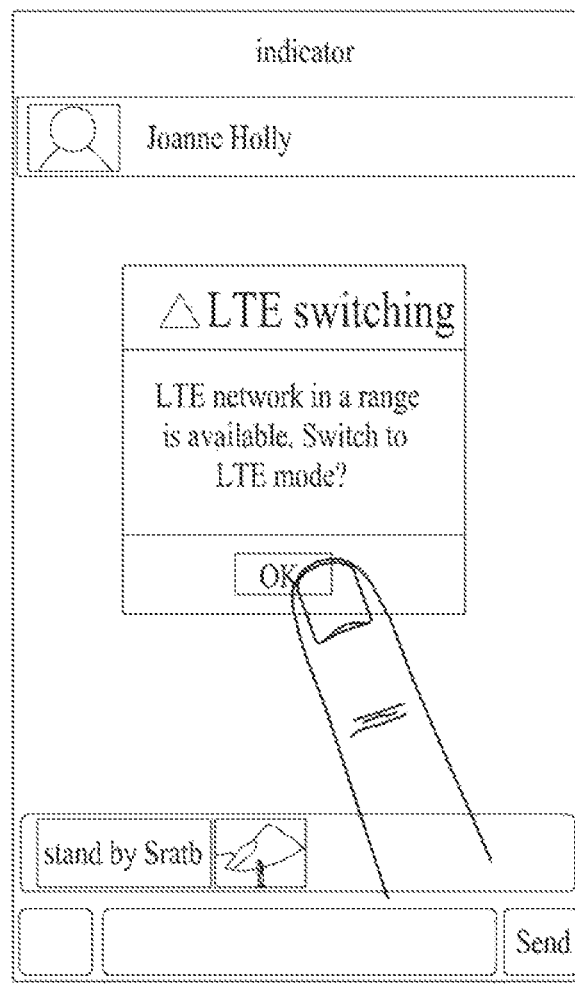
FIG. 9 is a diagram for an example of leading a handover to an LTE base station in case of attempting to deliver a content of a large capacity according to a third embodiment of the present invention.

FIG. 9 is a diagram for an example of leading a handover to an LTE base station in case of attempting to deliver a content of a large capacity according to a third embodiment of the present invention. In particular, the third embodiment described with reference to FIG. 9 assumes a case that a user equipment exists in an overlapping area between 3G network and LTE network.

Such a large-capacity file as a video file among the contents saved in a queue region may not be appropriate if transmitted on a general 3G network. In this case, according to a third embodiment of the present invention, a user equipment checks whether LTE network exists within a target distance and then displays such a popup message as shown in FIG. 9. Therefore, the user equipment is able to lead a user to perform a handover into an LTE base station.

Figure 10A:
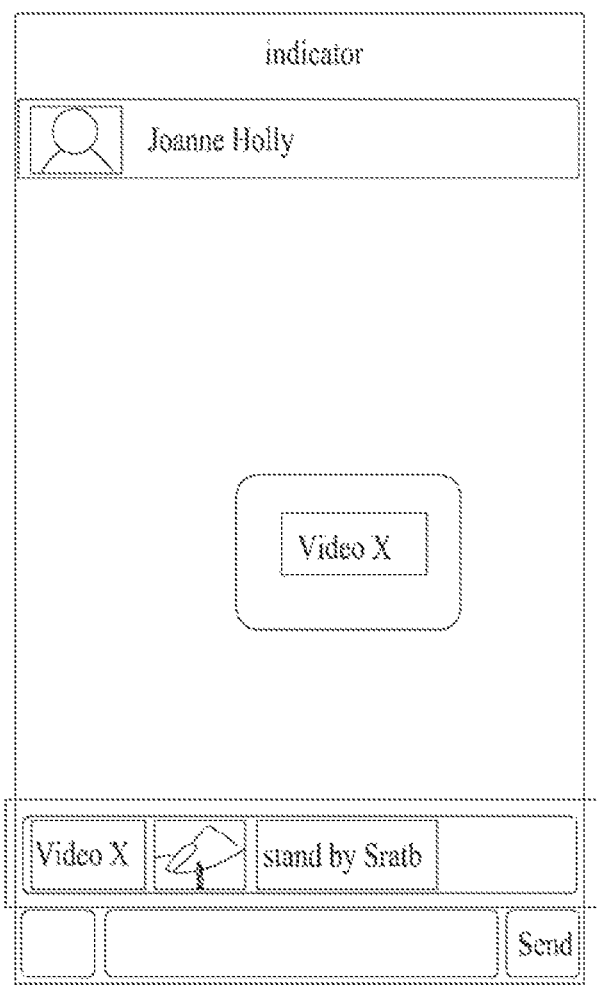
FIG. 10A and FIG. 10B are diagrams for an example of an operation of a user equipment in case of attempting to deliver a content of a large capacity according to a third embodiment of the present invention.
Figure 10B:
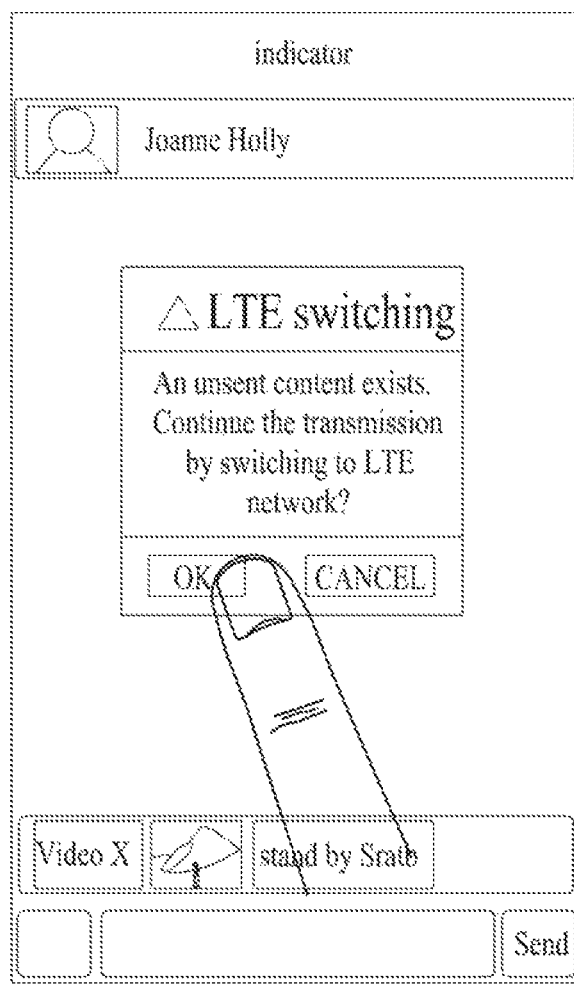

FIG. 10A and FIG. 10B are diagrams for an example of an operation of a user equipment in case of attempting to deliver a content of a large capacity according to a third embodiment of the present invention. In particular, a third embodiment described with reference to FIG. 10A and FIG. 10B assumes a case that a user equipment is located in an area where 3G network exists only.

Referring to FIG. 10A, if a user attempts to deliver a large-capacity file in an area where 3G network exists only or if the user fails in transmission of the large-capacity file in the area where the 3G network exists only, a thumbnail of the large-capacity file can be saved in a queue region together with a transmission failure indicator (e.g., 'X' in FIG. 10A). In this case, a user equipment can be provided with a function of making a reservation for the large-capacity file to be transmitted in case of making a handover into LTE network in the future. Preferably, in this case, it is preferentially displayed on a foregoing part of the queue region.

Meanwhile, when a user equipment makes a handover into LTE network, referring to FIG. 10B, a popup message can be displayed. In particular, the user equipment informs a user that an unsuccessful transmitted large-capacity file exists, via the popup message. The user equipment is then able to receive a selection of a presence or non-presence of transmission from the user.

Fourth Embodiment

Figure 11A:
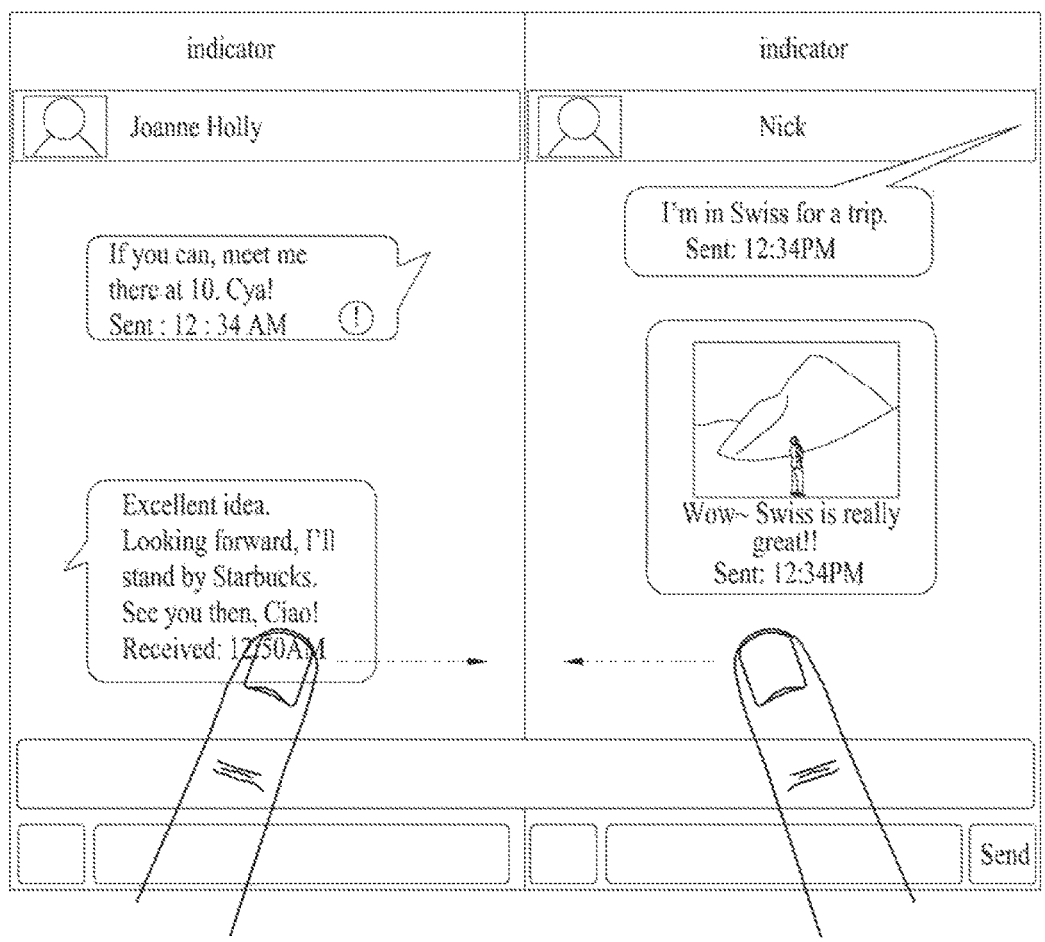
FIG. 11A and FIG. 11B are diagrams for an example of a message window controlling method according to a fourth embodiment of the present invention.
Figure 11B:
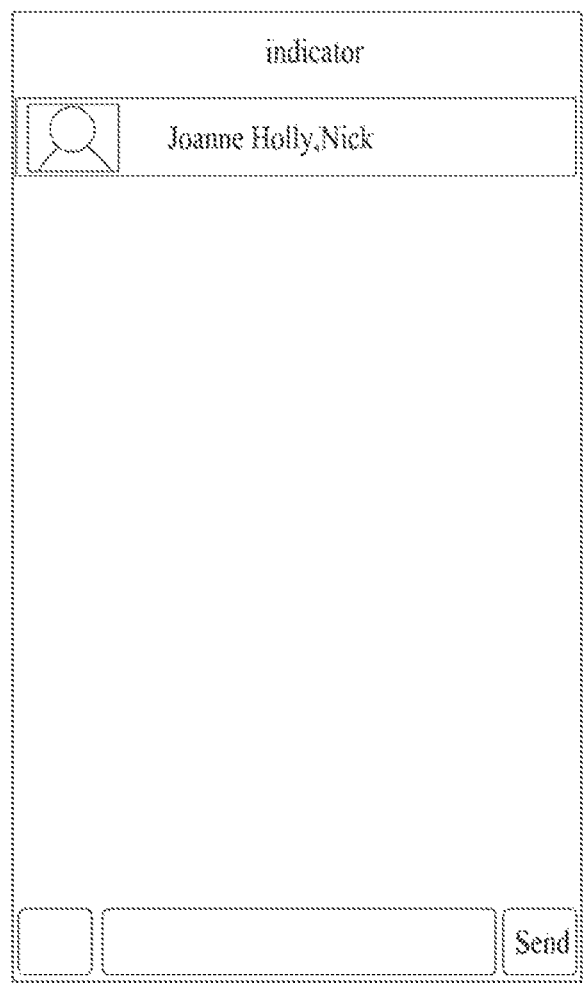

FIG. 11A and FIG. 11B are diagrams for an example of a message window controlling method according to a fourth embodiment of the present invention.

Referring to FIG. 11A and FIG. 11B, a user is able to perform a message transceiving with 'Joanne Holly' and 'Nicky' displayed on a display unit of a user equipment using individual message windows. In this case, referring to FIG. 11A, the user is able to generate a message window for a group chat through a touch input of a gesture of mixing the two windows together.

In particular, if a touch input of a gesture of mixing a message window for 'Joanne Holly' and a message window for 'Nicky' together is inputted to a user equipment, referring to FIG. 11B, it is able to generate a group message window for transceiving messages with the user, 'Joanne Holly' and 'Nicky' simultaneously.

Fifth Embodiment

In the following description, a method of controlling a multimedia message using a message window and an SNS (social networking service) window according to a fifth embodiment of the present invention is explained.

Figure 12A:
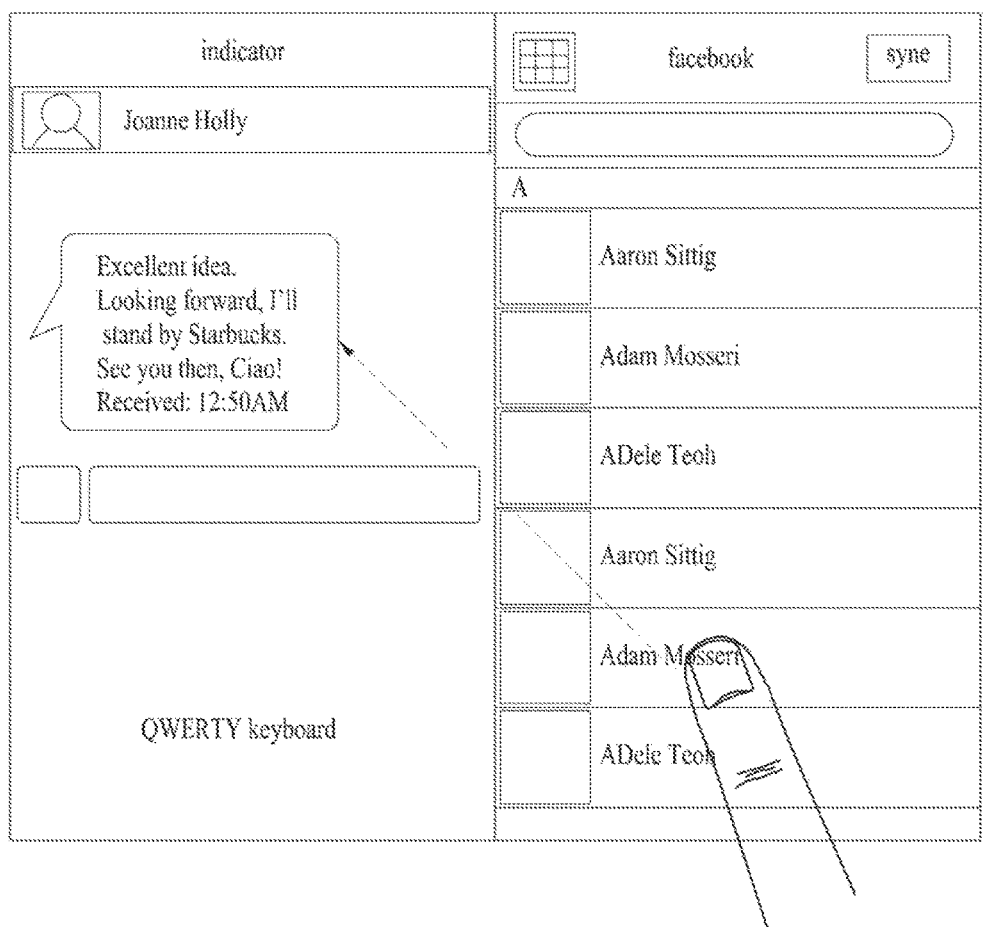
FIG. 12A and FIG. 12B are diagrams for a method of generating a group message window via an SNS user list according to a fifth embodiment of the present invention.
Figure 12B:
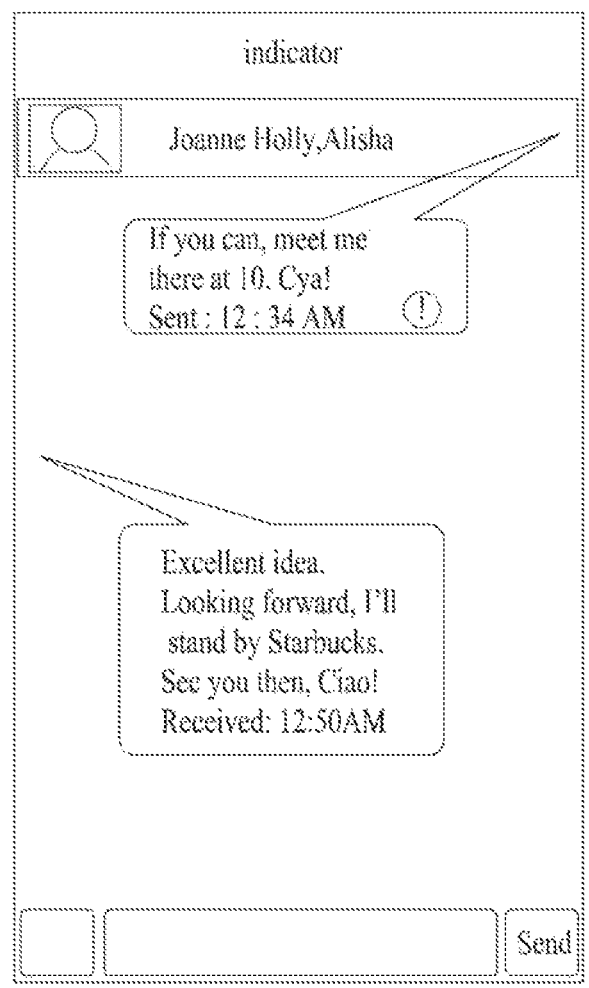

FIG. 12A and FIG. 12B are diagrams for a method of generating a group message window via an SNS user list according to a fifth embodiment of the present invention.

Referring to FIG. 12A and FIG. 12B, a user is having a chat with 'Joanne Holly', who is displayed on a display unit of a user equipment, via a message window. And, an SNS user list (e.g., Facebook address list in FIG. 12A) can be displayed on the display unit as well as the message window. In this case, it is able to generate a group message window, as shown in FIG. 12B, by inputting a touch input signal in a manner of applying a long touch to a specific user contained in an SNS user list shown in FIG. 12A and then dragging & dropping the specific user to the message window. In particular, it is able to generate a group message window for enabling a user, 'Joanne Holly' and 'Nicky' to receive messages simultaneously by inputting a touch input signal in a manner of applying a long touch to 'Alisha' in the SNS user list and then dragging & dropping the 'Alisha' to the message window.

Figure 13A:
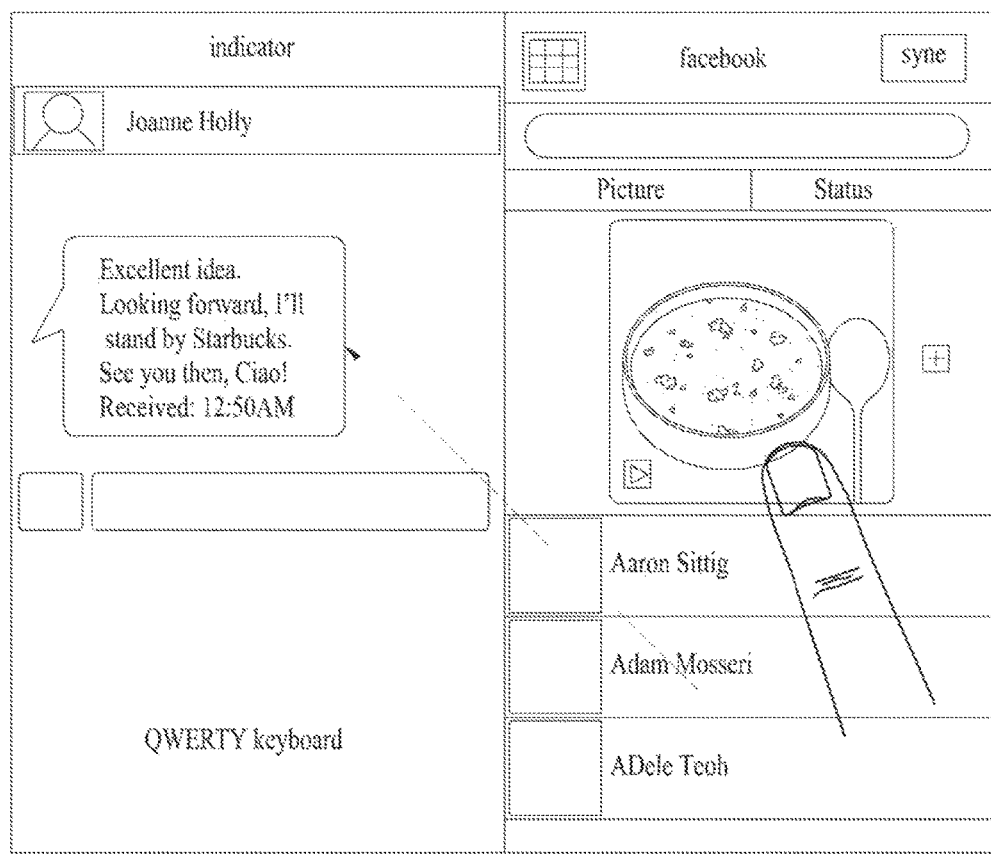
FIG. 13A and FIG. 13B are diagrams for an example of a method of sharing a file between an SNS window and a message window according to a fifth embodiment of the present invention.
Figure 13B:
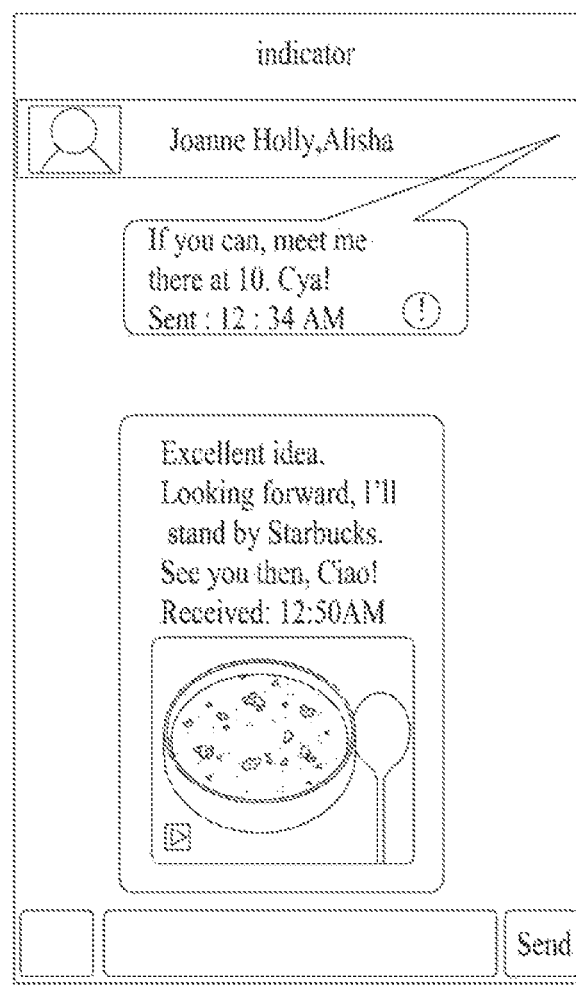

FIG. 13A and FIG. 13B are diagrams for an example of a method of sharing a file between an SNS window and a message window according to a fifth embodiment of the present invention.

Referring to FIG. 13A and FIG. 13B, by inputting a touch input signal in a manner of applying a long touch to a content displayed on an SNS window and then dragging & dropping the content to the message window [FIG. 13A], it is able to implement a user interface for adding the content displayed on the SNS window to a multimedia message in direct [FIG. 13B].

Likewise, by inputting a touch input signal in a manner of applying a long touch to a content saved in a queue region and then dragging & dropping the content to an SNS window, it is able to implement a user interface for adding the content saved in the queue region to the SNS window in direct.

Accordingly, the present invention is applicable to a wireless communication system, and more particularly, to an apparatus for controlling a multimedia message in a user equipment of a wireless communication system and method thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal for controlling at least two message interfaces, comprising:
   a touchscreen: and
   a controller configured to:
      cause the touchscreen to display a first message interface displaying messages transmitted from the mobile terminal to a first device and displaying messages received at the mobile terminal from the first device, wherein the messages of the first message interface are enumerated in a chat format in accordance with a time sequence;
      cause the touchscreen to display a second message interface displaying messages transmitted from the mobile terminal to a second device and displaying messages received at the mobile terminal from the second device wherein each of the first and second message interfaces is each of individual message windows;
      cause the touchscreen to display in a queue region a first item representative of content associated with a selected message displayed in the first message interface; and
      cause the touchscreen to display in the queue region a second item representative of content associated with a selected message displayed in the second message interface,
         wherein the queue region is displayed to be adjacent to the first and second message interfaces,
         wherein the first and second message interfaces are each independently scrollable in first and second opposing directions,
         wherein the first and second items in the queue region are displayed chronologically according to when they are copied from a respective one of the first or second message interface to the queue region, regardless of which of the first or second message interface they are copied from,
         wherein the first item displayed in the queue region includes a text of the selected message of the first message interface, and
      wherein the second item displayed in the queue region includes a text of the selected message of the second message interface.

2. The mobile terminal of claim 1, wherein
the first item displayed in the queue region includes only a partial portion of the text of the selected message of the first message interface.

3. The mobile terminal of claim 1, further comprising:
a transmitter operatively coupled to the controller, wherein the controller is further configured to:
transmit a message to the first device, wherein the message comprises information which is displayed in the first message interface.

4. The mobile terminal of claim 1, wherein each of the first message interface and the second message interface corresponds to one of a message menu, a social network service (SNS) menu, or an email menu.

5. The mobile terminal of claim 1, wherein the queue region is displayed to be below each of the first and second message interfaces.

6. The mobile terminal of claim 1, wherein
one of the displayed messages of the first message interface and one of the displayed messages of the second message interface each include text displayed adjacent to a status indicator, wherein
the first item displayed in the queue region includes the text of the one of the displayed messages of the first message interface and does not include the status indicator of the one of the displayed messages of the first message interface; and wherein
the second item displayed in the queue region includes the text of the one of the displayed messages of the second message interface and does not include the status indicator of the one of the displayed messages of the second message interface.

7. The mobile terminal of claim 1, wherein
the displayed messages of the first message interface and the displayed messages of the second message interface each include text displayed adjacent to information generated by the mobile terminal, wherein
the first item displayed in the queue region includes the text of the selected message of the first message interface and does not include information generated by the mobile terminal of the respective message of the first message interface; and wherein
the second item displayed in the queue region includes the text of the selected message of the second message interface and does not include information generated by the mobile terminal of the respective message of the second message interface.

8. The mobile terminal of claim 1, further comprising:
a memory that stores images and is operatively coupled to the controller which is further configured to:
cause the touchscreen to display a first image of the images at the first message interface, wherein the first image is associated with the first device.

9. The mobile terminal of claim 1, the first message interface and the second message interface correspond to the same menu.

10. The mobile terminal of claim 1, wherein a first user of the first device includes a group comprising at least two users, wherein each of the at least two users is identifiable by at least one identification information.

11. The mobile terminal of claim 1, wherein the first message interface comprises a right side, a left side, and a bottom side; and wherein
the second message interface comprises a right side, a left side, and a bottom side; and wherein
the right side of the first message interface is adjacent to the left side of the second message interface.

12. The mobile terminal of claim 11, wherein the queue region is adjacent to the bottom side of both the first message interface and the second message interface, and wherein a width of the queue region extends from a left side of the first message interface to a right side of the second message interface.

13. The mobile terminal of claim 1, wherein the queue region permits content associated with selected messages of any of the messages of the first message interface and any of the messages of the second message interface to be virtually copied to the queue region.

14. A method for controlling at least two message interfaces in a mobile terminal having a touchscreen, the method comprising:
displaying, on the touchscreen, a first message interface displaying messages transmitted from the mobile terminal to a first device and displaying messages received at the mobile terminal from the first device, wherein the messages of the first message interface are enumerated in a chat format in accordance with a time sequence;
displaying, on the touchscreen, a second message interface displaying messages transmitted from the mobile terminal to a second device and displaying messages received at the mobile terminal from the second device, wherein each of the first and second message interfaces is each of individual message windows;
displaying in a queue region a first item representative of content associated with a selected message displayed in the first message interface; and
displaying in the queue region a second item representative of content associated with a selected message displayed in the second message interface;
wherein the queue region is displayed to be adjacent to the first and second message interfaces;
wherein the first and second message interfaces are each independently scrollable in first and second opposing directions; and
wherein the first and second items in the queue region are displayed chronologically according to when they are copied from a respective one of the first or second message interface to the queue region, regardless of which of the first or second message interface they are copied from, wherein
the first item displayed in the queue region includes a text of the selected message of the first message interface; and wherein
the second item displayed in the queue region includes a text of the selected message of the second message interface.

15. The method of claim 14, wherein
the first item displayed in the queue region includes only a partial portion of the text of the selected message of the first message interface.

16. The method of claim 14, further comprising:
transmitting a message to the first device, wherein the message comprises information which is displayed in the first message interface.

17. The method of claim 14, wherein the messages exchanged of the first message interface are SMS messages, and the messages exchanged of the second message interface are email messages.

18. The method of claim 14, wherein the queue region is displayed to be below each of the first and second message interfaces.

19. The method of claim 14, wherein
one of the displayed messages of the first message interface and one of the displayed messages of the second message interface each include text displayed adjacent to a status indicator, wherein
the first item displayed in the queue region includes the text of the one of the displayed messages of the first message interface and does not include the status indicator of the one of the displayed messages of the first message interface; and wherein
the second item displayed in the queue region includes the text of the one of the displayed messages of the second message interface and does not include the status indicator of the one of the displayed messages of the second message interface.

20. The method of claim 14, wherein
the displayed messages of the first message interface and the displayed messages of the second message interface each include text displayed adjacent to information generated by the mobile terminal, wherein
the first item displayed in the queue region includes the text of the selected message of the first message interface and does not include information generated by the mobile terminal of the respective message of the first message interface; and wherein
the second item displayed in the queue region includes the text of the selected message of the second message interface and does not include information generated by the mobile terminal of the respective message of the second message interface.

21. The method of claim 14, further comprising:
storing images in a memory of the mobile terminal; and
cause the touchscreen to display a first image of the images at the first message interface, wherein the first image is associated with the first device.

22. The method of claim 14, wherein each of the first message interface and the second message interface corresponds to one of a message menu, a social network service (SNS) menu, or an email menu.

23. The method of claim 14, the first message interface and the second message interface correspond to the same application.

24. The method of claim 14, wherein a first user of the first device includes a group comprising at least two users, wherein each of the at least two users is identifiable by at least one identification information.

25. The method of claim 14, wherein the first message interface comprises a right side, a left side, and a bottom side; and wherein
the second message interface comprises a right side, a left side, and a bottom side; and wherein
the right side of the first message interface is adjacent to the left side of the second message interface.

26. The method of claim 25, wherein the queue region is adjacent to the bottom side of both the first message interface and the second message interface, and wherein a width of the queue region extends from a left side of the first message interface to a right side of the second message interface.

27. The method of claim 14, wherein the queue region permits content associated with selected messages of any of the messages of the first message interface and any of the messages of the second message interface to be virtually copied to the queue region.

28. A mobile terminal for controlling at least two text message interfaces, comprising:
a touchscreen: and
a controller configured to:
cause the touchscreen to display a first text message interface displaying text messages transmitted from the mobile terminal to a first device and displaying text messages received at the mobile terminal from the first device, wherein the messages of the first message interface are enumerated in a chat format in accordance with a time sequence;
cause the touchscreen to display a second text message interface displaying text messages transmitted from the mobile terminal to a second device and displaying text messages received at the mobile terminal from the second device, wherein each of the first and second message interfaces is each of individual message windows;
cause the touchscreen to display in the queue region a first text representative of content associated with a selected text message displayed in the first text message interface; and
cause the touchscreen to display in the queue region a second text representative of content associated with a selected text message displayed in the second text message interface;
wherein the queue region is displayed to be adjacent to the first and second text message interfaces;
wherein the first and second text message interfaces are each independently scrollable in first and second opposing directions; and
wherein the first text and the second text in the queue region are displayed chronologically according to when they are copied from a respective one of the first or second text message interface to the queue region, regardless of which of the first or the second text message interface they are copied from, wherein
the first text displayed in the queue region includes a text of the selected text message of the first text message interface; and wherein
the second text displayed in the queue region includes a text of the selected text message of the second text message interface.

29. The mobile terminal of claim 28, further comprising:
a transmitter operatively coupled to the controller, wherein the controller is further configured to:
transmit a text message to the first device, wherein the text message comprises information which is displayed in the first text message interface.

30. The mobile terminal of claim 28, further comprising:
a memory that stores images and is operatively coupled to the controller which is further configured to:
cause the touchscreen to display a first image of the images at the first text message interface, wherein the first image is associated with a user of the first device.

31. The mobile terminal of claim 28, wherein the first text message interface comprises a right side, a left side, and a bottom side; and wherein
the second text message interface comprises a right side, a left side, and a bottom side; and wherein
the right side of the first text message interface is adjacent to the left side of the second text message interface.

\* \* \* \* \*